(12) United States Patent
Appling (10) Patent No.: US 9,649,776 B2
(45) Date of Patent: May 16, 2017

(54) PORTABLE SAW APPARATUS FOR CUTTING OVERSIZED SUBSTRATES

(71) Applicant: Michael W. Appling, Buford, GA (US)

(72) Inventor: Michael W. Appling, Buford, GA (US)

( * ) Notice: Subject to any disclaimer, the term of this patent is extended or adjusted under 35 U.S.C. 154(b) by 74 days.

(21) Appl. No.: 14/481,876

(22) Filed: Sep. 9, 2014

(65) Prior Publication Data

US 2016/0067878 A1  Mar. 10, 2016

(51) Int. Cl.

| | | |
|---|---|---|
| *B27B 5/00* | (2006.01) | |
| *B27B 27/04* | (2006.01) | |
| *B27B 3/28* | (2006.01) | |
| *B26D 1/06* | (2006.01) | |
| *B25H 1/00* | (2006.01) | |
| *B27B 9/04* | (2006.01) | |
| *B23D 47/02* | (2006.01) | |
| *B23D 57/00* | (2006.01) | |

(52) U.S. Cl.
CPC .............. *B27B 9/04* (2013.01); *B23D 47/025* (2013.01); *B23D 57/0092* (2013.01)

(58) Field of Classification Search
CPC ...... B27B 9/04; B23D 57/0092; B23D 47/025
USPC ....... 83/477.2, 486.1, 574, 471.3; 144/286.1, 144/286.5, 1.1, 285; 248/129, 646, 647, 248/676, 678
See application file for complete search history.

(56) References Cited

U.S. PATENT DOCUMENTS

| | | | | |
|---|---|---|---|---|
| 2,911,017 A * | 11/1959 | Holder | ................. | B23Q 9/0085 83/486.1 |
| 3,485,275 A * | 12/1969 | Boudreau | ............ | B23Q 9/0092 30/376 |
| 4,452,117 A * | 6/1984 | Brickner | .............. | B23D 45/024 83/468 |
| 4,840,097 A * | 6/1989 | Campbell | ............ | B23Q 9/0085 83/471.3 |
| 5,080,152 A * | 1/1992 | Collins | ................ | B23D 45/021 144/136.95 |
| 5,421,231 A * | 6/1995 | Break | ................... | B23D 45/024 108/13 |
| 5,651,298 A * | 7/1997 | Break | ................... | B23D 47/025 83/471.3 |
| 5,868,054 A * | 2/1999 | Chubb | ...................... | B27B 5/20 144/286.5 |
| 5,873,463 A * | 2/1999 | Purcell | ................... | B25H 3/023 206/372 |
| 5,899,132 A * | 5/1999 | Break | ................... | B23D 47/025 144/286.1 |
| 6,070,696 A * | 6/2000 | Chubb | ................. | B23D 45/024 182/181.1 |
| 6,679,305 B2 * | 1/2004 | Petersen | ................. | B27B 27/08 144/253.1 |
| 7,013,780 B2 * | 3/2006 | Brunson | .............. | B23D 45/044 108/142 |

(Continued)

*Primary Examiner* — Ghassem Alie
*Assistant Examiner* — Bharat C Patel
(74) *Attorney, Agent, or Firm* — Baxam Law Group, LLC; Deanna L. Baxam (57) ABSTRACT

A portable saw table apparatus for cutting oversized substrates at a work site which provides a centrally pivoted cutting table, the cutting surface of which is not interrupted by a central pivot element; and further comprises a saw support which is also not centrally mounted on the pivoting table. Also provided is a method for cutting oversized substrates such as commercial-sized trim or other construction materials onsite at a construction site.

7 Claims, 9 Drawing Sheets

(56) References Cited

U.S. PATENT DOCUMENTS

| | | | | |
|---|---|---|---|---|
| 7,243,587 B2* | 7/2007 | Carroll | ................... | B27G 19/02 83/397 |
| 7,373,732 B2* | 5/2008 | Baida | ................... | B23D 59/003 33/640 |
| 7,779,737 B2* | 8/2010 | Newman, Jr. | ........ | B23D 45/046 83/471.2 |
| 8,191,449 B2* | 6/2012 | Wiezorek | ............. | B23D 47/025 83/34 |

* cited by examiner

PORTABLE SAW APPARATUS FOR CUTTING OVERSIZED SUBSTRATES

TECHNICAL FIELD OF THE INVENTION

The invention comprises a portable saw table that is transportable to a construction site for the purpose of cutting and mitering oversized substrates such as trim and moldings used for commercial or large building construction.

BACKGROUND OF THE INVENTION

Use of power saws for cutting trim, boards and other materials used in construction is known. The practice of mitering has been used to cut materials at a predetermined angle. For example, the installation of exterior moldings around corners or the joinder of elongated linear pieces requires that the pieces to be joined be cut at complementary angles and then joined.

Within the construction industry, the need for cutting and mitering of oversized substrates such as those used in commercial construction cannot be met by conventional saw accessories, which are typically designed to handle materials of smaller dimensions like residential trim. Large trim or other oversized building materials have necessitated such preparation being done at an offsite location away from the construction site. This practice is expensive and results in lost time and decreased productivity because of the delay in getting the materials cut to the desired sizes. There has therefore been a long felt and unmet need for a means of measuring, angling and cutting or mitering oversized materials directly onsite at the place of construction.

There are also technical issues with the management of oversized substrates. The size and curvature of the pieces cannot fit into the dimensions of conventional cutting accessories for a saw. For example, a large molding piece might have an elevated curvature or height of 6 or more inches, and could therefore not be cut using a manual miter box. The length of the oversized substrates to be cut also cannot be managed by the dimensions of conventional cutting apparatus.

It is therefore an object of this invention to provide an apparatus for cutting and mitering oversized substrates used in construction of large buildings.

It is another object of this invention to provide an apparatus that can be used onsite at a construction location for cutting and mitering oversized substrates without the need to send them to an offsite location.

It is yet another object of this invention to provide a method for efficient cutting of oversized substrates onsite at a construction location.

SUMMARY OF THE INVENTION

The portable oversized saw of the invention includes a base table which may be set on top of a worktable, stand, sawhorse or trestle; a pivot element perpendicularly positioned at or near the center of the base table that rotates according to the movement of the base table, and which is upwardly oriented in relation to said base table; a fence support extended between the opposing ends of the base table for supporting an oversized substrate while it is being cut; and a pivoting table attached to the upwardly elevated pivot element of the base, which includes indicator markings, or which may be attached to a Vernier-type scale measure, corresponding to various angles for positioning of a power saw or other cutting device. The invention further comprises a slotted saw support or guide positioned above and attached to the edges of the pivoting table, which includes a slot for directional movement of the power saw, and attachment means such as flanges, clamps or screw assemblies for attaching the saw support to the pivoting table. The substrate is directed to be cut by its movement along the fence, which is connected to the base table, toward the saw support, and it is cut by the saw blade as it passes beneath the saw support.

As used herein, the term "oversized substrate" includes commercial sized siding, ornamental trim, moldings, beams, planks, tubing, pipes and other elongated materials which must be cut to fit the dimensions of a particular building project.

In certain embodiments, the invention comprises a cutting table which is fully rotatable to more than 180°, or even up to 270° or more, with respect to an oversized substrate to be cut, and which is not impeded in its range of movement or orientation of the substrate because of attachments on the cutting surface.

In certain other embodiments, the range of motion of the pivoting table is limited by contact engagement with the sides of the fence element, the maximum range of motion ranging from about 90° to about 120°, preferably about 90°.

In other embodiments, the invention comprises a centrally positioned rotation mechanism which does not obstruct the saw support or the passage of substrate under the saw support, and thus provides a wide range of rotation and unimpeded throughput of the substrate that allows cutting of oversized substrates of varying height and thickness at various angles.

In various embodiments, the invention comprises a base which supports the rotation of a pivoting table on which is mounted a cutting saw as the table is positioned and repositioned according to the substrate.

In certain other embodiments, the invention further comprises pre-set markings corresponding to desired geometric angle measurements for cutting oversized substrates that may be located around the edge of the pivoting table, or may be separately attached to and in communication with the pivoting table. The angle measurements may be selected by the operator and locked in place using a mechanism that secures the saw support in alignment with the selected angle.

DETAILED DESCRIPTION OF CERTAIN EMBODIMENTS

Figure 1:
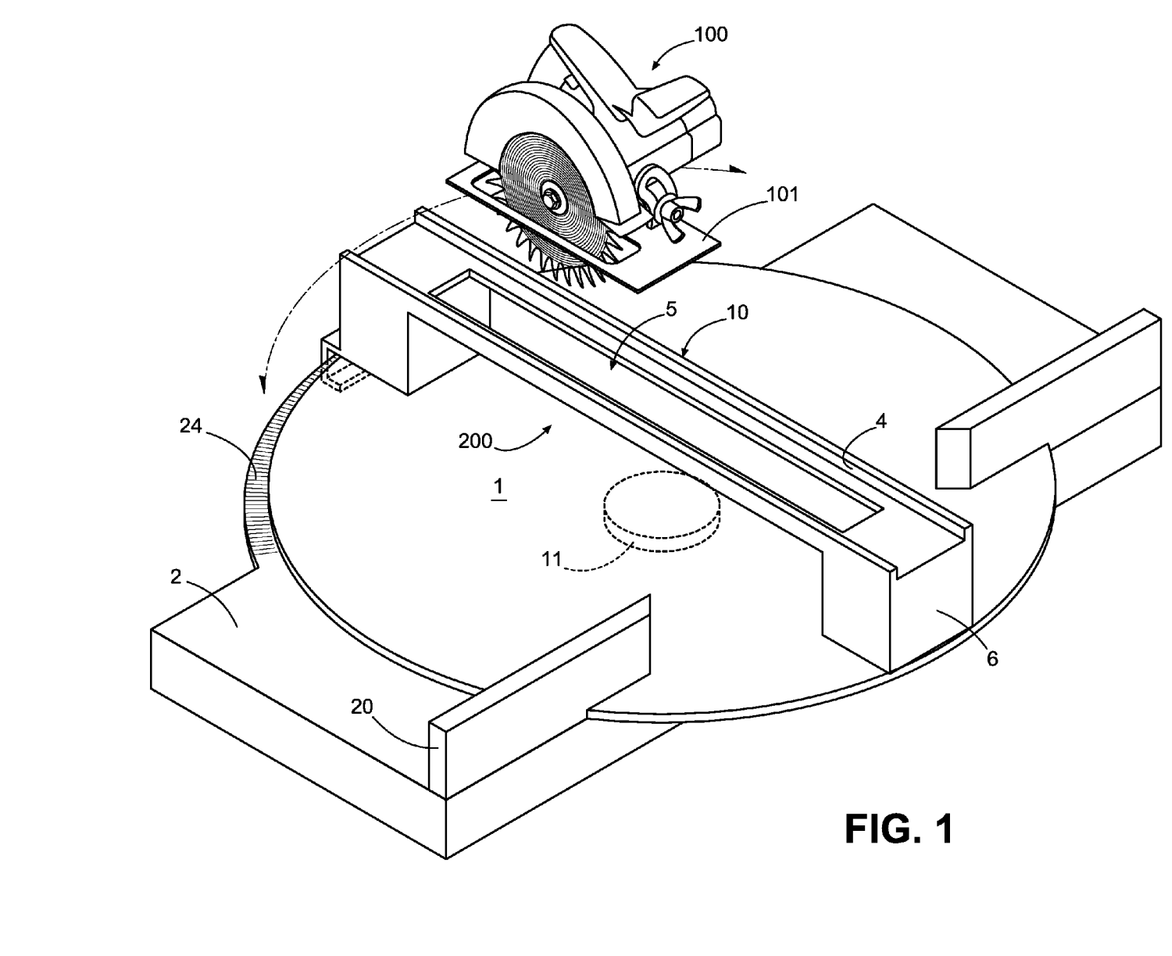
FIG. 1 is an isometric view of a portable saw table according to the invention showing the assembly of the various elements.
Figure 2:
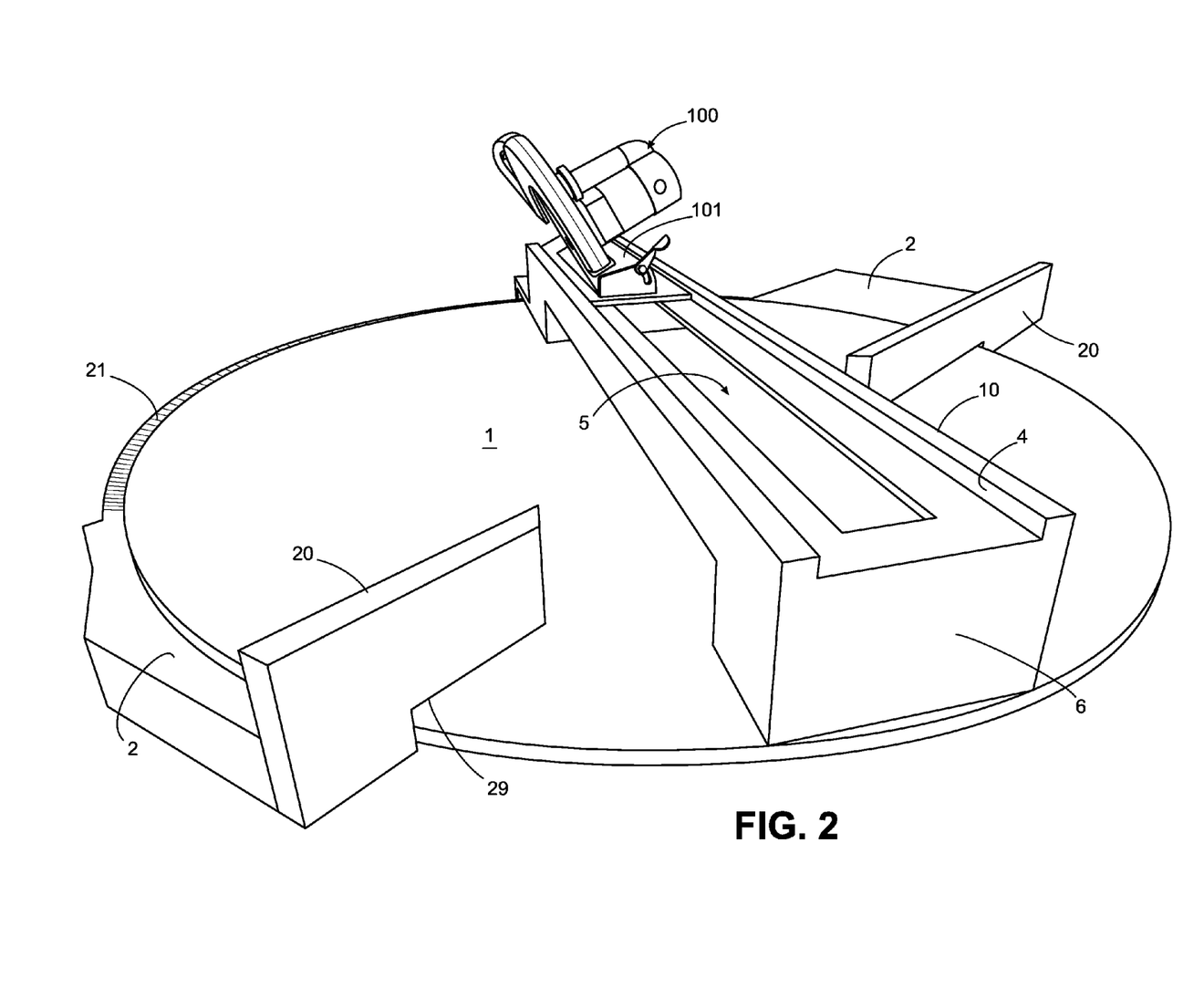
FIG. 2 an isometric view of the table of the invention showing the relationship between the fence and the saw support.

As seen in FIG. 1, an exemplary mobile saw table of the invention comprises a pivoting table 1 affixed over a base table 2. The base table 2 preferably extends outward below the pivoting table. A saw support 10 is attached to the top planar surface of the pivoting table 1, preferably along the circumference so that the saw support is elevated above approximately the diameter of the pivoting table 1. The saw support 10 comprises an angular shaped frame that is of a size and shape suitable to accommodate a cutting saw, with a slot 5 included therein for placement of a saw 100 and the saw apron 101. As shown in FIG. 1, the frame 4 of the saw support is of a length that is comparable to and compatible with the dimensions of the diameter of the pivoting table 2. In the embodiment of FIGS. 1 and 2, the frame 4 is elevated above the table 1 by means of at least a pair of slot support mounts 6.

An elongated fence element 20 traverses near one end of the circular pivoting table 1. The fence is contiguous with or removably connected to the base table 2 and further includes a slot 29 through which the rotating table 1 passes as it is being turned during the cutting process. The fence may be stored and transported in assembly as a continuous piece. When assembled in this manner, the fence 20 limits the movement of the saw if it is mounted and may thus serve as a stop or a safety while the machine is in field use. A length of the fence 20 corresponding approximately to the midsection beneath the saw guide may however be removable, and when this portion is removed to define a gap 20a, the saw can pass through unimpeded in the cutting of large substrates. When configured in this manner, the slot 29 allows rotation of the pivoting table to adjust the angle or otherwise accommodate the size of the substrate, and the gap 20a allows the saw to move completely through the thickness of the substrate. The device of the invention may be further adjusted to receive and cut smaller substrates according to the embodiment shown in FIG. 4A.

Figure 5:
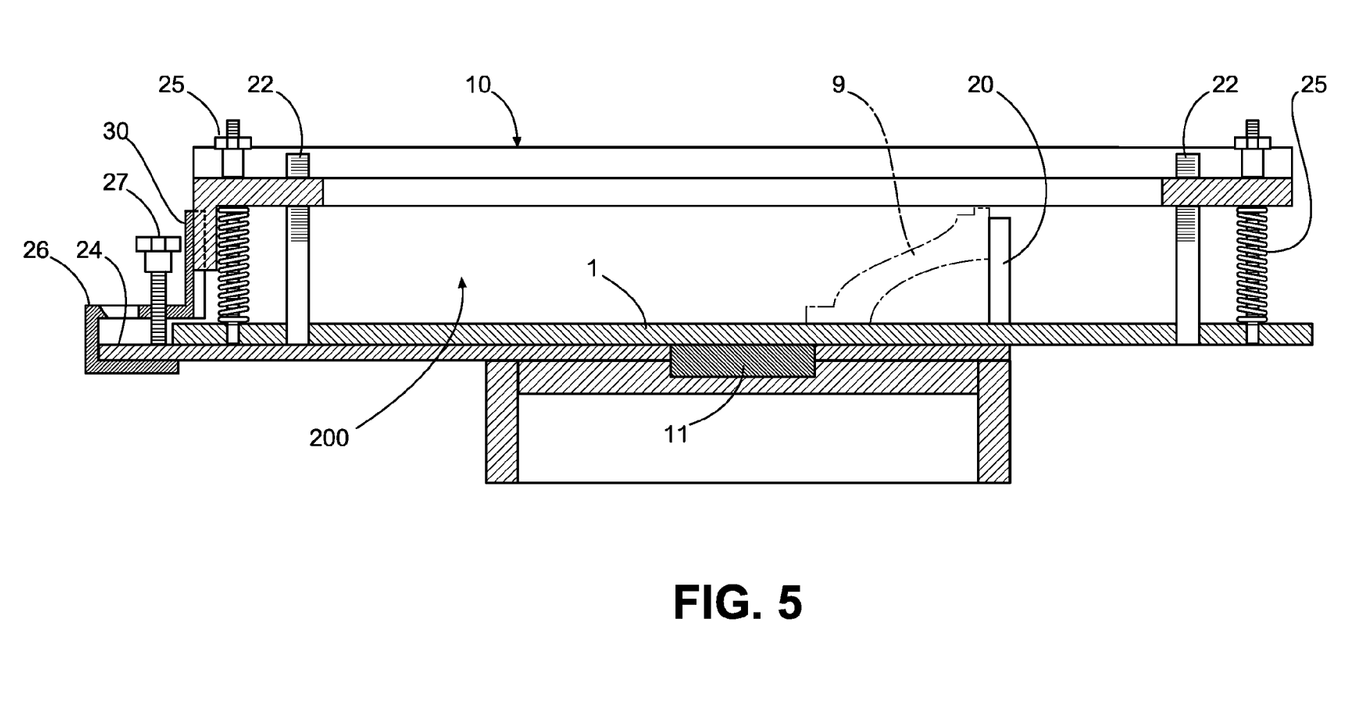
FIG. 5 is a cross sectional view through a horizontal axis of the table of the invention (shown in FIG. 4A).

FIG. 2 displays a desirable feature of the invention in which the entire cutting surface of the pivoting table under the saw support 10 is not obstructed by the pivot element 11 which enables rotation of the table 1. Rather, the pivot element 11 engages beneath the pivoting table 1 to anchor it to the base table 2. It may engage flush with the upper surface of the pivoting table 1, or it may engage in a recess within the lower surface of the table 1 so as not to be visible from a top view of table 1. This feature enables clearance of oversized pieces of substrate beneath the saw blade. In addition, the clearance area 200 between the saw support and the surface of pivoting table 1 can also be increased to allow passage of large, thick or curved materials by elevating the saw support 10, for example using the mechanisms exemplified in FIG. 3. In certain embodiments, the upper surface of the base table 2 may be fashioned with a recessed area to receive the dimensions of the pivoting table 1. In this respect, the mounted pivoting table 1 may be flush with the surrounding planar surfaces of the base table 2. Alternatively, as shown in FIGS. 1 and 2, the pivoting table may be slightly elevated above the base table 1. A further recess in the center of the base table is sized to receive a pivot element 11 (FIG. 5). The pivot element 11 may be formed from a durable material such as metal or wood, or a high load synthetic material. It typically has dimensions of at least one inch or more in height, and may be of variable width. Placement of the pivot element between the pivoting table 1 and the base table 2 enables the upper surface of the pivoting table to be unimpeded by attachment means, which is important to making the table usable for cutting large pieces of substrate. The only points of attachment are at the edges, along the circumference of the table, and this allows maximum clearance of height and width for large substrate cutting.

The pivot element may be permanently attached to the underside of the pivoting table 1 at one end, or it may be permanently fixed to the upper surface of the base table 2. The tables 1 and 2 may be maintained separately, transported that way and reassembled at the work site. Alternatively, the pivot element may be permanently attached to the surfaces of both tables.

Figure 4A:
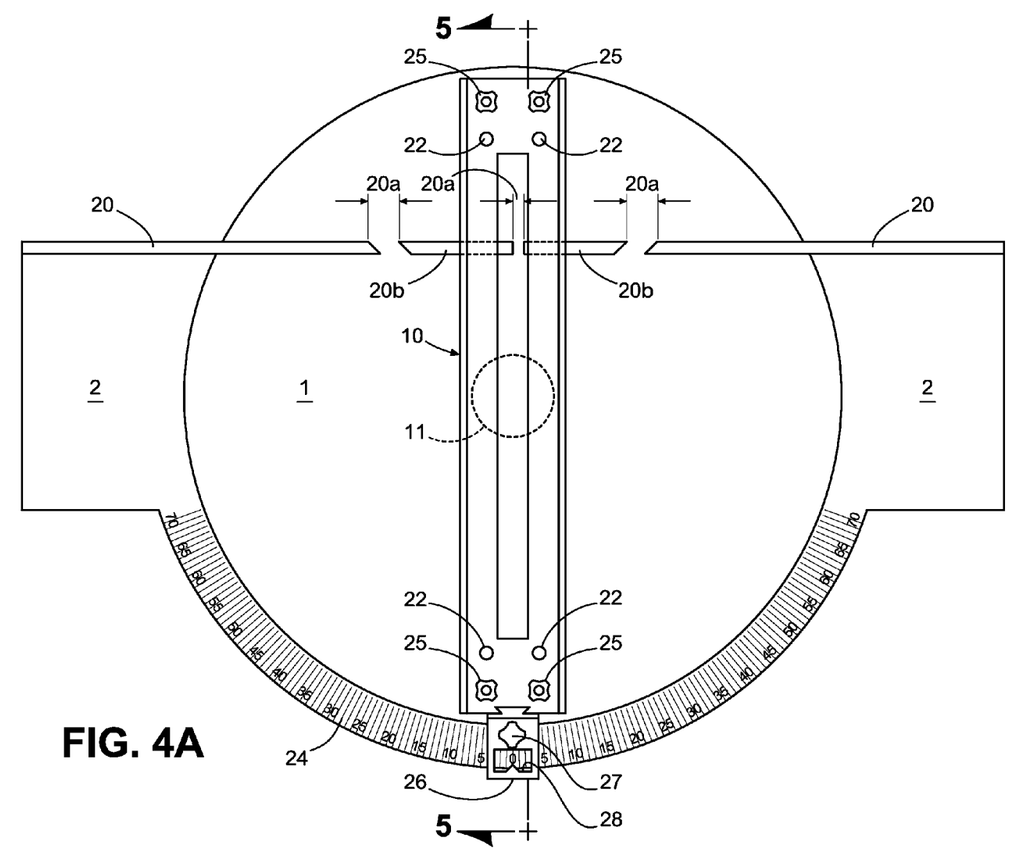
FIG. 4A is a top plan view of the invention which depicts use of a segmented fence for managing smaller (not oversized) substrates.
Figure 4B:
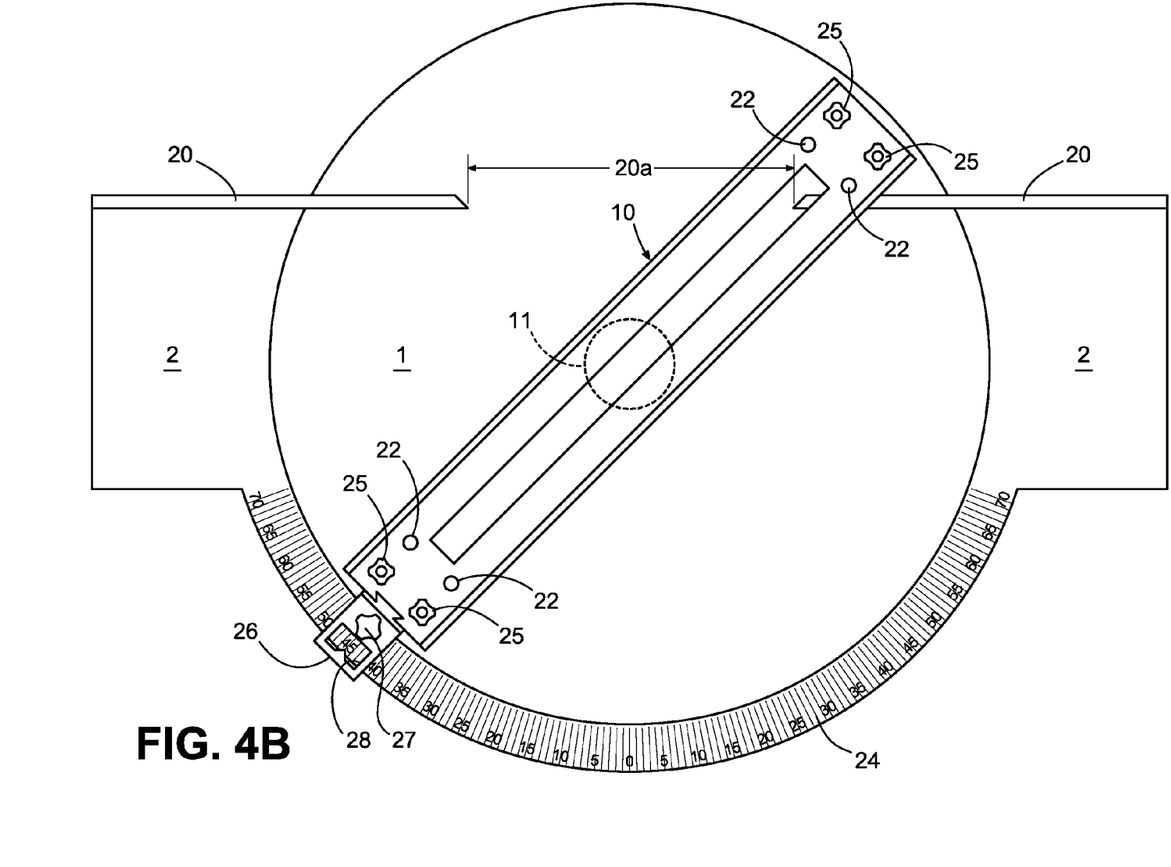
FIG. 4B is a top plan view of the invention showing the range of movement of the saw support in relation to the fence.
Figure 4C:
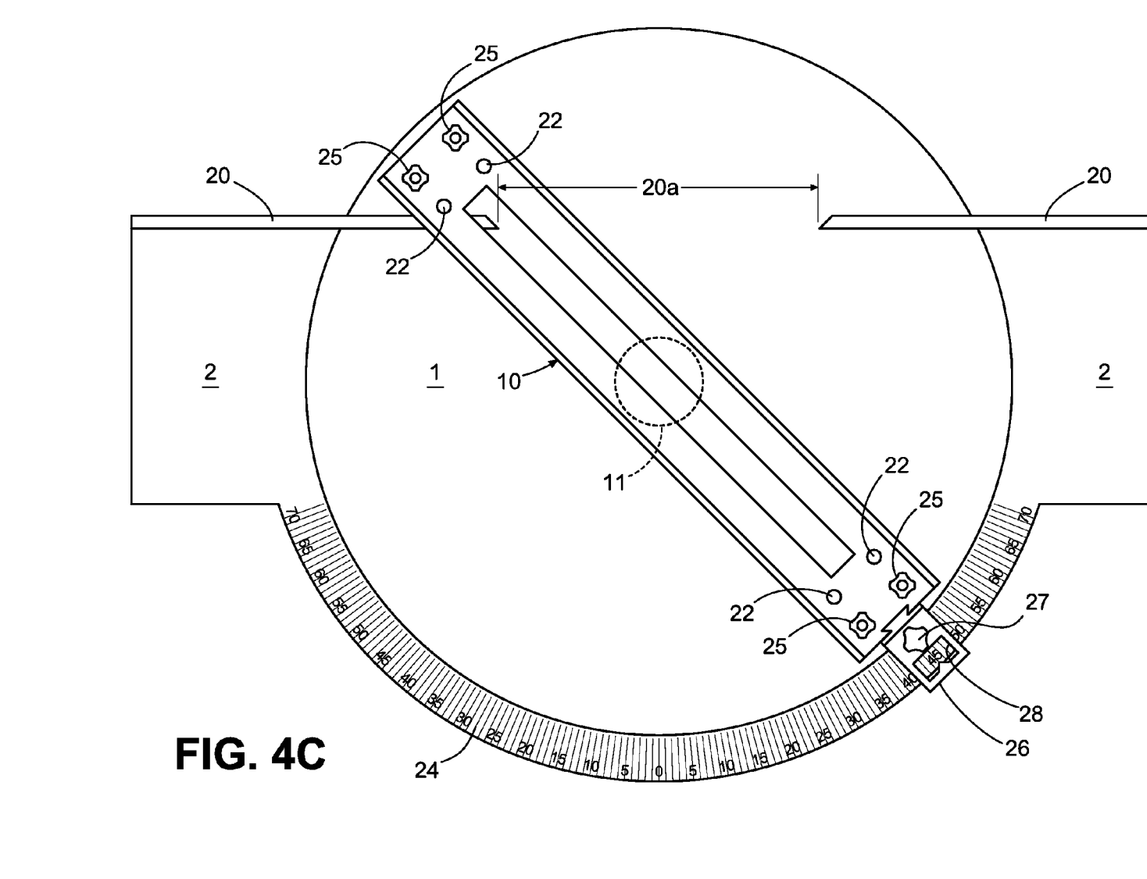
FIG. 4C is a top plan view of the invention showing the range of movement of the saw support in relation to the fence.

The base table is also a point of attachment for the fence 20. In this respect, the fence 20 may be attached separately or formed continuously as part of the base table 1. The base table 2 may also include side extensions (seen in FIGS. 4A. B and C), that serve to support the elongated pieces of oversized substrate. These extensions can be formed to be adaptable, for example as pull-out wings that can be attached by levers or cross beams at the side edges of the base table 2. The fence and these side extensions provide additional support to the oversized pieces of substrate to be fed to the saw, as they are often heavier and bulkier than residential construction materials.

Figure 3:
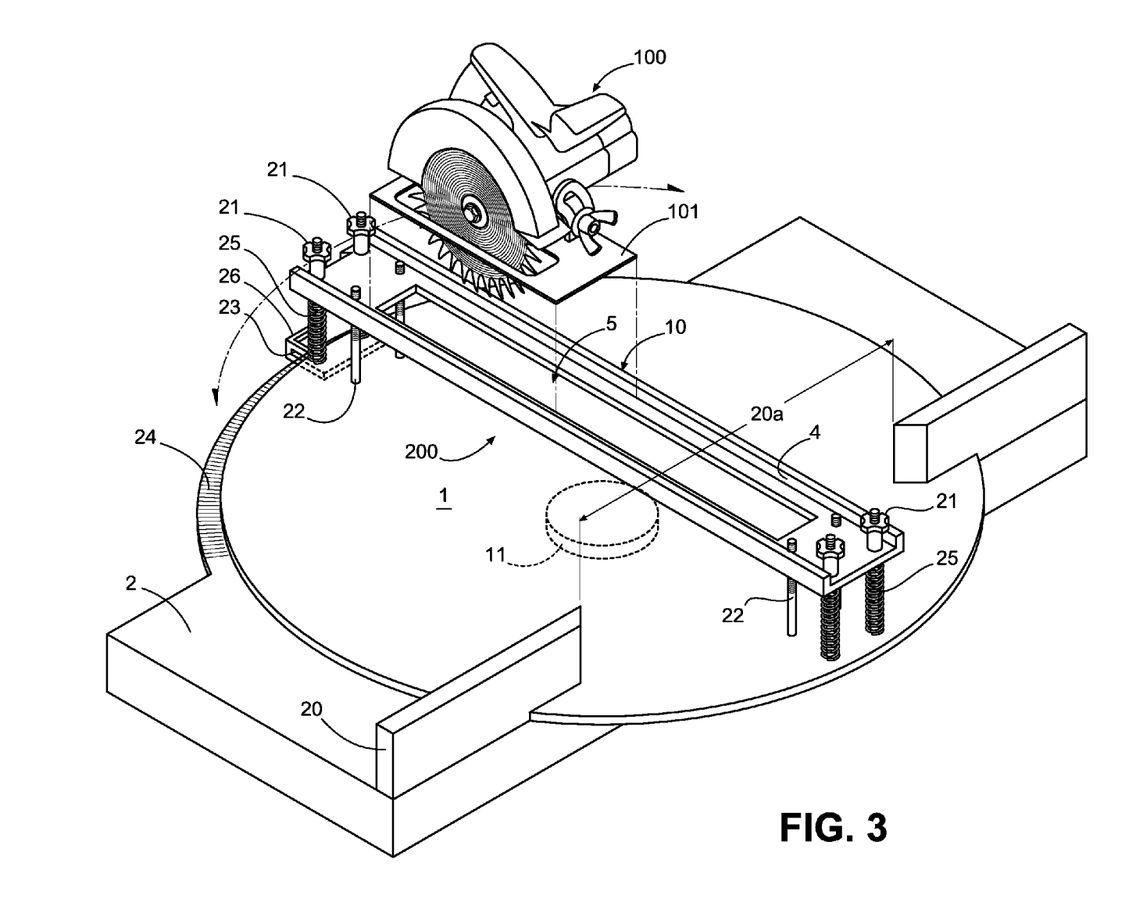
FIG. 3 is an isometric view of a further embodiment of the invention.

To change the clearance height, the height of the mounts 6 may be varied to increase or lower the frame 4 above the pivoting table 1. The minimum clearance height for cutting oversized substrates according to the method of the invention is approximately 4 inches, however this clearance can be elevated up to 8 inches or more, only being limited by the diameter of the saw blade. In the embodiment of FIG. 3, the height of the "pass-through" area 200 between the frame 4 and the surface of the pivoting table 1 may be increased for larger substrate pieces by engagement of spring and dowel elements attached to the saw support 10 to increase the clearance for the saw. In this respect, each of the four corners of the saw support may be fitted with a locking assembly comprised of a screw 21 and spring 25, which may be tightened to affix the saw support 10 at the desired height above the table 1. The desired height of the saw support may be standardized at each corner by means of dowels 22 that are marked with predetermined height measurements. By releasing the screws to reduce pressure on the springs, the height of the frame 4 can be moved upward, and conversely, it is lowered by tightening of the screws. The adjustment to change height facilitates the handling of large substrates.

In addition to increasing the clearance height area 200, the invention suitably further accommodates large substrates by allowing for adjustment of the cutting angle while still supporting the substrate as the invention is being used in the field. According to FIGS. 4A, 4B and 4C, the saw support is mounted to the pivoting table at the edges and therefore moves freely with the rotation of the table. It is not rotated from a center axis, nor is it positioned off center, as this could lead to unbalanced loading of the weight of the oversized substrate on the cutting surface, which could be hazardous and also result in inaccurate cutting or mitering. As shown for example in FIGS. 4A-C, the saw support 10 is fully mounted on and co-movable with the pivoting table 1. The saw support is movable between the range of angles defined by the placement and size of the fence gap 20a. For example, the angles defined by placement of the fence and the fence gap may range from 45° to 90° or more. The particular desired angle may be selected by engagement of a measuring scale, having for example a Vernier caliper type-mechanism that selects the desired angle. As is shown in FIG. 4A, the measurement scale 24 is marked with various degree or compass-type orientation markings. A gauge assembly 26 is set in place over the scale by means of a clamp 23 (shown in FIG. 3). This assembly includes a viewing window 28 through which the desired angle can be viewed. The gauge assembly further comprises a bracket 30 (shown in FIG. 5) which communicates with and attaches to the saw support 10, for example at the mounts 6. This attachment to the saw support enables it to correspond exactly in movement to the movement of the support 10. A screw type knob 27 attached to the assembly 26 is tightened to secure the saw support at the desired angle as it is displayed on the scale 24. FIG. 4B demonstrates rotation of the saw support to an angle of about 45° in a clockwise direction until it is stopped by one side of the fence. FIG. 4C demonstrates rotation of about 45° in a counterclockwise direction. It should be understood that these exemplary angles are not intended to be limiting as the invention, including the fence, may be configured to allow for several other cutting angles. For example, the fence may run along only one long side of the base table 1, in which case the entire remaining area over the pivoting table towards the opposite edge of the base table 1 forms the fence gap 20a, which allows for turning angles of 180° or more. It should be understood that the fence serves a desirable function in that it stabilizes and guides the oversized substrate as it is brought on to the cutting surface, and the process of guiding the substrate usually involves butting the substrate up against the fence to hold it securely for cutting.

In a further embodiment according to FIG. 4A, the fence 20 may be segmented so that smaller segments 20b of the fence may be removed, so forming gaps 20a of reduced width that can accommodate smaller pieces of substrate while at the same time maintaining sufficient fence support to keep these smaller pieces secured stably for cutting.

Figure 6:
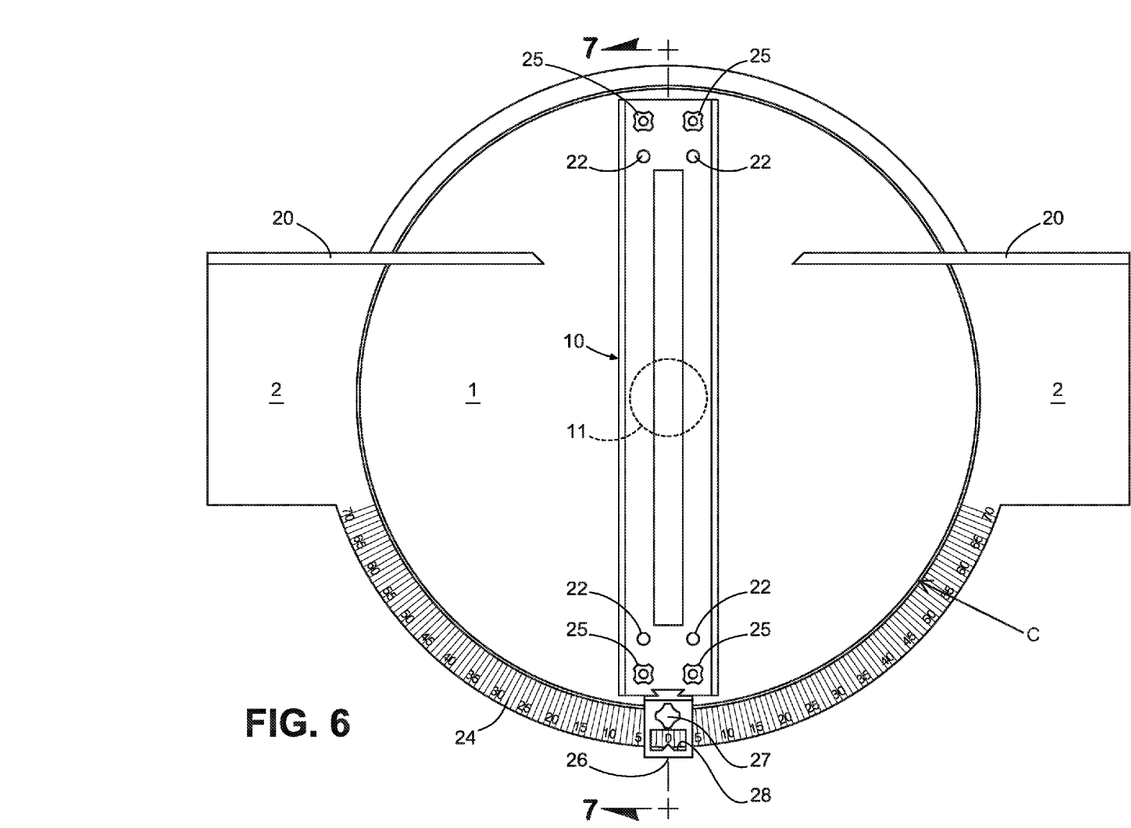
FIG. 6 is a top plan view of an embodiment of the invention showing the pivoting table set within a recess of the base.
Figure 7:
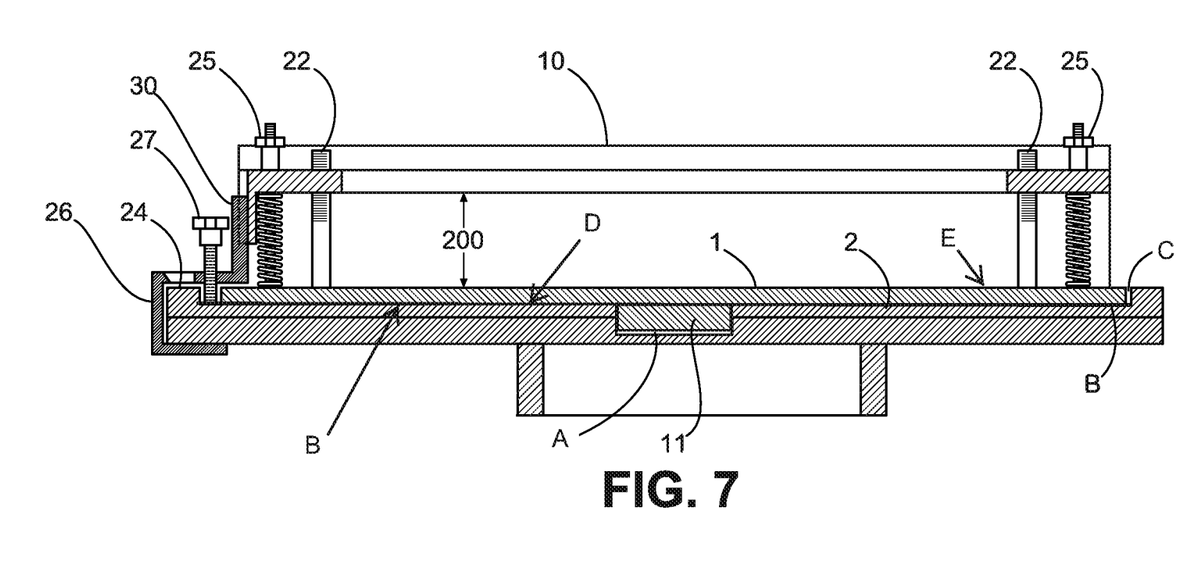
FIG. 7 is a cross sectional view through an axis 6-6 of the invention shown in FIG. 6.

FIG. 5 represents a cross-section of the device according to an embodiment of the invention. An oversized substrate piece 9 is passed under the saw support 10 while it is abutted against the fence 20. In this embodiment, as in the embodiment of FIG. 3, the invention provides for a raising and lowering of the clearance area 200. The relationship of the measurement element 24 is shown in this embodiment as being positioned inferiorly to the surface of the pivoting table 1. However, in other embodiments, the surface of the measurement element 24 is aligned linearly and co-planar (flush) with the surface of the pivoting table 1. As can be seen from the view of this figure, the housing assembly may reactively adjust to the change of height of the saw support 10, but such adjustment does not change the angle of measurement set via the gauge assembly 26. In the embodiment of FIG. 6, the pivoting table 1 is inset within a recess C in the upper surface B of the base 2 such that the surface of the pivoting table 1 is surrounded by and is flush with the upper surface B of the base. As shown in the transverse sectional view of FIG. 7, this embodiment comprises the upper surface of the base 2 with a first recessed area A in the center of the upper surface thereof as well as a second, wider recessed area C also formed in the upper surface B, said second recessed area surrounding the first recessed area. Vertically positioned pivot element 11 is perpendicularly disposed and attached to the center of the upper surface of the base within and at the center of the first recessed area A. The pivot element 11 has an unattached end which corresponds in dimensions to the dimensions of the first recessed area of the upper surface of the base, and said first recessed area A is sized to receive said unattached end of the pivot element. The underside surface D of pivoting table 1 is inset into the recess C and is attached to the vertically positioned pivot element 11. Underside surface D of the pivoting table is thus mounted over the pivot element 11 without protrusion of either the attachment end itself or any portion of the pivot element 11 on through to the upper surface E of said pivoting table 1.

The saw suitable for use in the apparatus of the invention is an electrically powered saw such as a circular saw. The saw may be cordless or powered by AC current, and should have sufficient voltage and blade size capacity to cut through large pieces of material. The saw is mounted within the slot 5 of the saw support 10, usually by insertion through an end opening with guides that allow the saw to be inserted and positioned over the slot 5. The saw 100 may be integrally or removably connected with an apron 101 that helps to guide the saw along the slot 5. Any power saw with capacity to manage the intended substrates may be used with the invention.

The portable saw table assembly of the invention may be used alone, or it may be mounted atop a table or other stable support, such as sawhorse brackets. The entire table assembly, except for the saw support slot, which should preferably be a material resistant to accidental nicks and cuts from the saw, may be constructed of wood, heavy duty composites or plastic, or metal.

INDUSTRIAL APPLICABILITY

The invention is suitable for efficient cutting and shaping of oversized substrates, which are to be used as construction pieces, directly onsite at a construction location. The device of the invention represents an improvement over the common level of skill in the art, which required sending such oversized substrates to an offsite shop location for cutting. The pieces then had to be transported back to the job site, which may incur additional expense. The invention also represents an improvement over the previously known level of skill in that the position, assembly and function of the elements of the invention provide an expansive surface of the pivoting table that can accommodate oversized substrates. The elevation of the saw support and resulting clearance also enable management and cutting of oversized substrate pieces.

While preferred embodiments of the invention have been described herein for the purposes of this disclosure, it is to be understood that this disclosure encompasses those changes in the elements and materials thereof as would readily suggest themselves to one skilled in the art, and such modifications are therefore within the spirit of the disclosed invention and the appended claims.

The invention claimed is:

1. A method of cutting oversized substrates with a portable saw at a work site comprising:
    (a) erecting at the work site a portable saw table comprising
        a pivoting table comprising an upper surface and an underside surface thereof;
        a base having a first recessed area in the center of an upper surface thereof and a second recessed area within said upper surface of the base surrounding said first recessed area, wherein said second recessed area is sized to receive the pivoting table as an insert and, when inserted, the upper surface of said pivoting table is flush and co-planar with the surrounding upper surface of the base;

a vertically positioned pivot element which is perpendicularly disposed within the first recessed area in the center of the upper surface of the base, wherein said pivot element comprises a first end which corresponds to the first recessed area and said first recessed area is sized to receive said first end of the pivot element and said first end of the pivot element is inserted into the first recessed area; and said pivot element further comprises a second end opposite to the first end, wherein the underside surface of the pivoting table is attached to the second end of the pivot element; and wherein said pivoting table is mounted over the pivot element without protrusion of the pivot element through to the upper surface of said pivoting table; and further wherein the second recessed area of the base is sized to receive the pivoting table as an inset;

a fence attached to the base for supporting an oversized substrate while said substrate is being cut, the fence having therein a slot for through passage of the pivoting table as the pivoting table is rotated; and a slotted saw support that extends across and is affixed to opposing edges of the diameter of the pivoting table, and which is elevated above the surface of the pivoting table, wherein the area beneath said saw support and the uppermost surface of the pivoting table is unobstructed;

(b) inserting a portable saw into the slotted saw support;

(c) introducing an oversized substrate onto the pivoting table according to the placement of the fence and through a fence gap; and (d) cutting the oversized substrate according to a desired angle.

2. The method of claim 1 further comprising mounting the portable saw table on a work table, sawhorse or other support.

3. The method of claim 1 wherein the oversized substrates are selected from large trim, planks, beams, piping and rebar.

4. The method of claim 1 wherein the portable saw table further comprises an angle measurement element for fixing the cutting angle for the saw support on the pivoting table, the angle measurement element having indicia for geometric angles on the upper surface thereof.

5. The method of claim 1 wherein the portable saw table further comprises a degree lock handle that removably locks the slotted saw support in place according to a desired cutting angle.

6. The method of claim 1 wherein the saw support adjustably raises and lowers the height between the saw support and the upper surface of the pivoting table.

7. The method of claim 1 the fence further comprising segments that can be removed to form a gap of reduced width that accommodates smaller pieces of substrate.

* * * * *